(12) United States Patent
Watanabe et al.

(10) Patent No.: US 9,168,424 B2
(45) Date of Patent: Oct. 27, 2015

(54) MULTI-PIECE SOLID GOLF BALL

(71) Applicant: BRIDGESTONE SPORTS CO., LTD., Minato-ku, Tokyo (JP)

(72) Inventors: Hideo Watanabe, Chichibushi (JP); Atsuki Kasashima, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 185 days.

(21) Appl. No.: 13/947,345

(22) Filed: Jul. 22, 2013

(65) Prior Publication Data

US 2014/0018191 A1   Jan. 16, 2014

Related U.S. Application Data

(63) Continuation-in-part of application No. 13/548,648, filed on Jul. 13, 2012, now Pat. No. 8,905,863.

(51) Int. Cl.

| *A63B 37/04* | (2006.01) |
| *A63B 37/06* | (2006.01) |
| *A63B 37/00* | (2006.01) |
| *C08G 18/48* | (2006.01) |
| *C08G 18/76* | (2006.01) |
| *C08G 18/32* | (2006.01) |
| *C08L 75/08* | (2006.01) |

(52) U.S. Cl.
CPC ......... *A63B 37/0076* (2013.01); *A63B 37/0003* (2013.01); *A63B 37/008* (2013.01); *A63B 37/0045* (2013.01); *A63B 37/0047* (2013.01); *A63B 37/0064* (2013.01); *A63B 37/0065* (2013.01); *A63B 37/0066* (2013.01); *A63B 37/0077* (2013.01); *A63B 37/0083* (2013.01); *A63B 37/0091* (2013.01); *A63B 37/0092* (2013.01); *A63B 37/0096* (2013.01); *C08G 18/3206* (2013.01); *C08G 18/4854* (2013.01); *C08G 18/7671* (2013.01); *C08L 75/08* (2013.01); *A63B 37/0051* (2013.01); *A63B 37/0059* (2013.01)

(58) Field of Classification Search
USPC .................................................. 473/351–378
See application file for complete search history.

(56) References Cited

U.S. PATENT DOCUMENTS

| 5,306,760 A | 4/1994 | Sullivan |
| 5,312,857 A | 5/1994 | Sullivan |
| 5,497,996 A * | 3/1996 | Cadorniga ..................... 473/365 |

(Continued)

FOREIGN PATENT DOCUMENTS

| JP | 11-035633 A | 2/1999 |
| JP | 11-164912 A | 6/1999 |

(Continued)

*Primary Examiner* — Alvin Hunter
(74) *Attorney, Agent, or Firm* — Sughrue Mion, PLLC

(57) ABSTRACT

In a multi-piece solid golf ball having a core, an envelope layer, an intermediate layer and a cover, the core is formed primarily of a thermoplastic elastomer, the envelope layer is formed of a rubber composition containing primarily a rubber material, the intermediate layer is formed of a resin composition containing primarily an ionomer, and the cover is formed of a resin composition containing primarily a urethane. The relationships among the specific gravities and the surface hardnesses of the respective layers are optimized. This golf ball enables an increased distance on full shots with a driver and improved controllability in the short game to be achieved, and also makes it possible to obtain a further reduction in the spin rate on full shots.

6 Claims, 1 Drawing Sheet

(56) References Cited

U.S. PATENT DOCUMENTS

| | | | | |
|---|---|---|---|---|
| 5,743,816 | A * | 4/1998 | Ohsumi et al. | 473/376 |
| 5,779,562 | A * | 7/1998 | Melvin et al. | 473/373 |
| 5,976,034 | A * | 11/1999 | Kato et al. | 473/363 |
| 6,045,460 | A * | 4/2000 | Hayashi et al. | 473/376 |
| 6,071,201 | A | 6/2000 | Maruko | |
| 6,194,505 | B1 | 2/2001 | Sone et al. | |
| 6,251,031 | B1 * | 6/2001 | Hayashi et al. | 473/376 |
| 6,254,495 | B1 * | 7/2001 | Nakamura et al. | 473/371 |
| 6,271,296 | B1 * | 8/2001 | Nakamura et al. | 524/423 |
| 6,290,612 | B1 * | 9/2001 | Maruko et al. | 473/376 |
| 6,394,912 | B1 | 5/2002 | Nakamura et al. | |
| 6,431,998 | B1 | 8/2002 | Nakamura et al. | |
| 6,494,795 | B2 * | 12/2002 | Sullivan | 473/372 |
| 6,533,682 | B2 * | 3/2003 | Sullivan | 473/371 |
| 6,605,009 | B1 | 8/2003 | Nakamura et al. | |
| 6,642,314 | B2 | 11/2003 | Sone et al. | |
| 6,688,991 | B2 | 2/2004 | Sullivan et al. | |
| 6,692,380 | B2 * | 2/2004 | Sullivan et al. | 473/376 |
| 6,756,436 | B2 | 6/2004 | Rajagopalan et al. | |
| 6,780,126 | B2 * | 8/2004 | Ladd et al. | 473/376 |
| 6,824,477 | B2 | 11/2004 | Rajagopalan et al. | |
| 6,894,098 | B2 | 5/2005 | Rajagopalan et al. | |
| 6,916,254 | B2 * | 7/2005 | Ladd et al. | 473/376 |
| 6,939,907 | B2 | 9/2005 | Rajagopalan et al. | |
| 6,962,539 | B2 | 11/2005 | Sullivan et al. | |
| 6,981,926 | B2 * | 1/2006 | Sullivan et al. | 473/376 |
| 6,988,962 | B2 * | 1/2006 | Sullivan et al. | 473/376 |
| 7,041,009 | B2 | 5/2006 | Sullivan et al. | |
| 7,115,049 | B2 * | 10/2006 | Sullivan et al. | 473/376 |
| 7,125,348 | B2 | 10/2006 | Sullivan et al. | |
| 7,157,512 | B2 | 1/2007 | Rajagopalan et al. | |
| 7,230,045 | B2 | 6/2007 | Rajagopalan et al. | |
| 7,285,059 | B2 | 10/2007 | Sullivan et al. | |
| 7,294,680 | B2 | 11/2007 | Sone et al. | |
| 7,300,364 | B2 * | 11/2007 | Boehm et al. | 473/376 |
| 7,329,194 | B2 * | 2/2008 | Watanabe et al. | 473/376 |
| 7,331,878 | B2 * | 2/2008 | Boehm et al. | 473/376 |
| 7,354,357 | B2 * | 4/2008 | Sullivan et al. | 473/373 |
| 7,641,571 | B2 | 1/2010 | Hebert et al. | |
| 7,648,427 | B2 | 1/2010 | Isogawa | |
| 7,651,415 | B2 * | 1/2010 | Ladd et al. | 473/376 |
| 7,652,086 | B2 * | 1/2010 | Sullivan et al. | 524/322 |
| 7,963,862 | B2 * | 6/2011 | Sullivan et al. | 473/376 |
| 8,123,629 | B2 * | 2/2012 | Ladd et al. | 473/376 |
| 8,382,610 | B2 * | 2/2013 | Sullivan et al. | 473/376 |
| 8,618,197 | B2 * | 12/2013 | Sullivan et al. | 524/322 |
| 8,663,032 | B2 * | 3/2014 | Fitchett et al. | 473/383 |
| 8,690,713 | B2 * | 4/2014 | Sullivan et al. | 473/376 |
| 8,905,863 | B2 * | 12/2014 | Watanabe | 473/376 |
| 8,932,680 | B2 * | 1/2015 | Ishii et al. | 427/407.1 |
| 2012/0043686 | A1 | 2/2012 | Ichikawa et al. | |
| 2012/0046127 | A1 | 2/2012 | Ichikawa et al. | |

FOREIGN PATENT DOCUMENTS

| | | |
|---|---|---|
| JP | 2002-293996 A | 10/2002 |
| JP | 2012-040376 A | 3/2012 |
| JP | 2012-045382 A | 3/2012 |
| JP | 2012090973 A * | 5/2012 |
| JP | 2012130674 A * | 7/2012 |
| WO | 98/46671 | 10/1998 |

* cited by examiner

MULTI-PIECE SOLID GOLF BALL

CROSS-REFERENCE TO RELATED APPLICATION

This application is a continuation-in-part of copending application Ser. No. 13/548,648 filed on Jul. 13, 2012, the entire contents of which are hereby incorporated by reference.

BACKGROUND OF THE INVENTION

The present invention relates to a multi-piece solid golf ball composed of a core, an envelope layer, an intermediate layer and a cover that have been formed as successive layers. More specifically, the invention relates to a golf ball which has both a flight performance and a controllability capable of better satisfying professional golfers and skilled amateur golfers, and which also enables an even lower spin rate to be achieved on full shots.

Efforts have hitherto been made to provide golf balls with a multilayer structure so as to increase the distance traveled by the ball and enhance the feel of the ball at impact. In order to lower the spin rate, increase the initial velocity and further improve the feel at impact, various golf balls with multilayer structures of three or more layers have subsequently been described as well.

Golf balls having a somewhat soft cover, an intermediate layer formed of an ionomer material that is relatively hard compared with the cover, and a solid core of a one- or two-layer construction that is formed of rubber material are currently in wide use among professional golfers and skilled amateur golfers as balls endowed with both an excellent flight performance and excellent controllability. Such balls exhibit a high controllability in the short game because of the somewhat soft cover. In addition, owing to the combination of this cover with, on the inside thereof, a hard, high-resilience layer made of an ionomer material, these balls also suppress excessive spin and exhibit a high rebound on full shots with a driver.

Various balls of this type have hitherto been disclosed in, for example, U.S. Pat. Nos. 6,071,201, 6,254,495, 6,271,296, 6,394,912, 6,431,998, 6,605,009, 6,688,991, 6,756,436, 6,824,477, 6,894,098, 6,939,907, 6,962,539, 6,988,962, 7,041,009, 7,125,348, 7,157,512, 7,230,045, 7,285,059, 7,641,571 and 7,652,086, JP-A 2012-40376, JP-A 2012-45382 and U.S. Pat. No. 7,648,427.

In this way, there exists among professional golfers and skilled amateurs a strong demand for golf balls which enable such golfers to achieve a performance in keeping with their own level of skill. Hence, developing a golf ball endowed with a flight performance and controllability capable of satisfying larger numbers of golfers is important for expanding the golfer base.

SUMMARY OF THE INVENTION

It is therefore an object of the invention to provide a multi-piece solid golf ball which, as a golf ball for professional golfers and skilled amateur golfers, achieves in particular an increased distance on full shots with a driver (W#1) and an improved controllability in the short game, and which moreover is capable of achieving an even lower spin rate on full shots.

As a result of extensive investigations aimed at achieving the above objects, the inventor has discovered that, in a golf ball which includes, in order from the inside: a solid core, an envelope layer, an intermediate layer and a cover, by forming the solid core of a soft thermoplastic elastomer, the spin rate on full shots is suppressed, enabling a good distance to be obtained; by forming the envelope layer of a rubber material that has a high resilience and is harder than the solid core, it is possible to obtain a high initial velocity and to suppress excess spin receptivity on full shots; by forming the intermediate layer of an ionomer resin that is harder than the envelope layer, the spin rate on full shots can be suppressed; and moreover by forming the outermost cover layer of soft urethane rubber, a high spin performance on approach shots in the short game and an excellent scuff resistance can be achieved.

Accordingly, the invention provides the following multi-piece solid golf ball.

[1] A multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of one or more thermoplastic elastomer selected from the group consisting of polyester, polyamide, polyurethane, olefin and styrene-type thermoplastic elastomers and has a diameter of from 10 to 30 mm, a specific gravity of more than 1.0 and less than 1.3, and a deflection when compressed under a final load of 1,275 N (130 kgf) from an initial load of 98 N (10 kgf) of from 3.6 to 10 mm, the envelope layer is formed of a rubber composition containing primarily a rubber material and has a thickness of from 3 to 10 mm, the intermediate layer is formed of a resin composition containing primarily an ionomer, and the cover is formed of a resin composition containing primarily a urethane;

wherein the envelope layer, the intermediate layer and the cover have specific gravities which satisfy the condition:

envelope layer specific gravity>intermediate layer specific gravity<cover specific gravity;

and wherein the core, the envelope layer, the intermediate layer and the cover have Shore D surface hardnesses which satisfy the condition:

core surface hardness<envelope layer surface hardness<intermediate layer surface hardness>cover surface hardness.

[2] The multi-piece solid golf ball of [1], wherein the core is formed primarily of a polyether ester elastomer.

[3] The multi-piece solid golf ball of [1], wherein the core has a diameter of from 20 to 30 mm.

[4] The multi-piece solid golf ball of [1], wherein the core diameter is from 22 to 28 mm.

[5] The multi-piece solid golf ball of [1], wherein the envelope layer thickness is from 4 to 8 mm.

[6] The multi-piece solid golf ball of [1], wherein the core, the envelope layer, the intermediate layer and the cover have Shore D surface hardnesses which satisfy the conditions:

$1 \leq$ envelope layer surface hardness−core surface hardness$\leq 40$ $5 \leq$ intermediate layer surface hardness−envelope layer surface hardness$\leq 25$ $-25 \leq$ ball surface hardness−intermediate layer surface hardness$\leq -1$.

[7] The multi-piece solid golf ball of [1], wherein the intermediate layer has a specific gravity of less than 1.0.

BRIEF DESCRIPTION OF THE DIAGRAMS

DETAILED DESCRIPTION OF THE INVENTION

Figure 1:
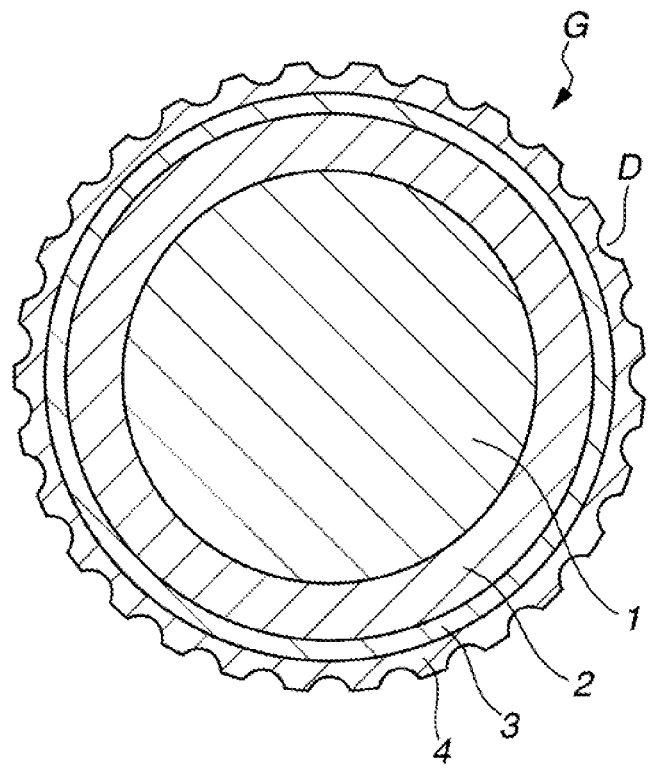
FIG. 1 is a schematic sectional view showing a multi-piece solid golf ball according to the invention.

The invention is described more fully below. First, FIG. 1 shows the cross-sectional structure of the multi-piece solid golf ball of the invention. The golf ball G shown here has a four-layer construction which includes a core 1, an envelope layer 2 encasing the core, an intermediate layer 3 encasing the envelope layer, and a cover 4 encasing the intermediate layer. A plurality of dimples D are typically formed on the surface of the cover 4. Each of these layers is described in detail below.

First, the solid core (sometimes referred to below as simply "the core") is described.

It is critical to set the core diameter to from 10 to 30 mm. The lower limit in the core diameter may be set to more preferably at least 20 mm, and even more preferably at least 22 mm. The upper limit in the core diameter may be set to more preferably 28 mm or less, and even more preferably 26 mm or less. If the core diameter is too small, the spin rate on full shots may become too high, as a result of which a good distance may not be achieved. On the other hand, if the diameter is too large, the durability of the ball to repeated impact may worsen, the feel at impact may become too hard, and the ball rebound may be inadequate, as a result of which a good distance may not be achieved.

The core has a center hardness which, although not subject to any particular limitation, may be set to a Shore D hardness of preferably at least 10, more preferably at least 20, and even more preferably at least 25. There is no particular upper limit on the center hardness of the core, although the Shore D hardness may be set to not more than 55, preferably not more than 47, and even more preferably not more than 40. If the center hardness is too low, the feel at impact may be too soft and the durability of the ball to cracking under repeated impact may worsen. On the other hand, at a center hardness which is too high, the spin rate may rise excessively, as a result of which an increased distance may not be achieved and the feel at impact may be too hard.

The core has a surface hardness which, although not subject to any particular limitation, may be set to a Shore D hardness value of preferably at least 16, more preferably at least 26, and even more preferably at least 31. There is no particular upper limit on the surface hardness of the core, although the Shore D hardness may be set to preferably not more than 61, more preferably not more than 53, and even more preferably not more than 46. If the surface hardness is too low, the feel at impact may be too soft and the durability of the ball to cracking under repeated impact may worsen. On the other hand, at a surface hardness which is too high, the feel at impact may become too hard and the durability to cracking on repeated impact may worsen.

Here, "center hardness" refers to the hardness measured at the center of the cross-section obtained by cutting the core in half (through the center), and "surface hardness" refers to the hardness measured on the surface of the core (spherical surface). Also, "Shore D hardness" refers to the hardness measured using a type D durometer in general accordance with ASTM D2240-95.

It is critical for the core to have a deflection, when compressed under a final load of 1,275 N (130 kgf) from an initial load of 98 N (10 kgf), which is set to from 3.6 to 10 mm. The lower limit may be set to preferably at least 4.0 mm, and more preferably at least 5.0 mm. The upper limit may be set to preferably not more than 8.0 mm, and more preferably not more than 7.0 mm. If the deflection is too large (that is, if the core is too soft), the feel of the ball at impact may be too soft and the durability to cracking on repeated impact may worsen. On the other hand, if the deflection is too small (that is, if the core is too hard), the spin rate may rise excessively, as a result of which a good distance may not be achieved, and the feel at impact may be too hard.

The solid core is formed using a thermoplastic elastomer. In the present invention, particularly from the standpoint of obtaining a high rebound and an excellent flight performance, the solid core is formed primarily of one or more thermoplastic elastomer selected from the group consisting of polyester, polyamide, polyurethane, olefin and styrene-type thermoplastic elastomers. A commercial product may be used as the thermoplastic elastomer. Illustrative examples include polyester-type thermoplastic elastomers such as Hytrel (DuPont-Toray Co., Ltd.), polyamide-type thermoplastic elastomers such as Pebax (Toray Industries, Inc.), polyurethane-type thermoplastic elastomers such as Pandex (Dainippon Ink & Chemicals, Inc.), olefin-type thermoplastic elastomers such as Santoprene (Monsanto Chemical Co.), and styrene-type thermoplastic elastomers such as Tuftec (Asahi Chemical Industry Co., Ltd.).

In this invention, from the standpoint of moldability and resilience, the use of polyester-type thermoplastic elastomers is preferred. Of these, the use of polyether ester elastomers is especially preferred. Examples of such commercially available polyether ester elastomers include Hytrel 3046, Hytrel 4047 and Hytrel 4767, all available from DuPont-Toray Co., Ltd.

A filler may be added to adjust the specific gravity of the core and to increase durability. In addition, where necessary, various additives may be included in this core-forming material. For example, pigments, dispersants, antioxidants, light stabilizers, ultraviolet absorbers and parting agents may be suitably included.

The core has a specific gravity which must be more than 1.0 and less than 1.3. The lower limit may be set to preferably at least 1.03, and more preferably at least 1.05. The upper limit may be set to 1.25 or less, and more preferably 1.20 or less. If the specific gravity is too large, the core resilience may become lower, as a result of which a good distance may not be achieved. On the other hand, if the specific gravity is too small, the resilience may become lower and the durability of the ball to repeated impact may worsen.

No particular limitation is imposed on the method of obtaining the solid core, although use may be made of a known method such as injection molding. The use of a method in which the core-forming material is injected into the cavity of a core mold is preferred.

Next, the envelope layer is described.

The envelope layer is a layer that covers the periphery of the core. In the present invention, it is critical for the thickness of the envelope layer to be set to from 3 to 10 mm. The lower limit in the thickness of the envelope layer may be set to preferably at least 4 mm, and more preferably at least 5 mm. The upper limit in the thickness may be set to preferably not more than 9 mm, and more preferably not more than 8.5 mm. If the envelope layer is too thin, the spin rate-lowering effect on full shots may be inadequate, as a result of which a good distance may not be achieved, and the durability to cracking on repeated impact may worsen. On the other hand, if the envelope layer is too thick, the spin rate-lowering effect on full shots may be inadequate, as a result of which a good distance may not be achieved, and the feel of the ball on full shots may become too hard.

The surface hardness of the envelope layer, although not subject to any particular limitation, may be set to a Shore D hardness value of preferably at least 40, more preferably at least 47, and even more preferably at least 55. There is no particular upper limit in the surface hardness of the envelope layer, although the Shore D hardness may be set to preferably not more than 80, more preferably not more than 70, and even more preferably not more than 65. If the surface hardness is too low, the ball rebound may become low and the spin rate-lowering effect on full shots may be inadequate, as a result of which a good distance may not be achieved. On the other hand, if the surface hardness is too high, the feel may become hard and the durability to cracking on repeated impact may worsen.

As used herein, "surface hardness" refers to the hardness measured at the surface of a sphere obtained by molding the material. Also, "Shore D hardness" refers to the hardness measured using a type D durometer in general accordance with ASTM D2240-95. The same applies below.

The envelope layer is formed using a rubber composition. In the present invention, although not subject to any particular limitation, particularly from the standpoint of obtaining a high rebound and an excellent flight performance, this layer is preferably formed using a rubber composition containing the subsequently described polybutadiene as the base rubber.

The polybutadiene is not subject to any particular limitation, although the use of a polybutadiene having on the polymer chain a cis-1,4 bond content of at least 60 wt %, preferably at least 80 wt %, more preferably at least 90 wt %, and most preferably at least 95 wt %, is recommended. If the cis-1,4 bond content among the bonds on the molecule is too small, the rebound may decrease.

The content of the 1,2-vinyl bonds included in the polybutadiene is not subject to any particular limitation, although it is recommended that the content on the polymer chain be preferably not more than 2 wt %, more preferably not more than 1.7 wt %, and even more preferably not more than 1.5 wt %. If the 1,2-vinyl bond content is too high, the rebound may decrease.

From the standpoint of obtaining a molded and vulcanized material having a good rebound, the polybutadiene is preferably one which has been synthesized using a rare earth catalyst or a Group VIII metal compound catalyst, and most preferably one which has been synthesized using a rare earth catalyst. Also, where necessary, an organoaluminum compound, an alumoxane, a halogen-bearing compound, a Lewis base and the like may be used in combination with these catalysts. In the present invention, it is preferable to use, as the various foregoing compounds, those mentioned in JP-A 11-35633.

In the invention, of the above rare earth catalysts, the use of a neodymium catalyst that employs a neodymium compound, which is a lanthanum series rare-earth compound, is especially recommended for obtaining a polybutadiene rubber having a high cis-1,4 bond content and a low 1,2-vinyl bond content at an excellent polymerization activity. Preferred examples of such rare-earth catalysts include those mentioned in JP-A 11-35633, JP-A 11-164912 and JP-A 2002-293996.

Illustrative examples of such lanthanide series rare-earth compounds include halides, carboxylates, alcoholates, thioalcoholates and amides of atomic number 57 to 71 metals.

Although not subject to any particular limitation, from the standpoint of enhancing rebound, it is recommended that the content of the above polybutadiene in the base rubber be preferably at least 10 wt %, more preferably at least 20 wt %, and even more preferably at least 40 wt %.

In the present invention, rubbers other than the above polybutadiene may also be included, insofar as the objects of the invention are attainable. Illustrative examples include polybutadiene rubbers other than the above-described polybutadiene, styrene-butadiene rubbers, natural rubbers, isoprene rubbers and ethylene-propylene-diene rubbers. These may be used singly or as a combination of two or more types.

In the invention, additives such as the subsequently described co-crosslinking agents, organic peroxides, antioxidants, inert fillers and organosulfur compounds may be suitably blended with the above base rubber.

Illustrative examples of co-crosslinking agents include unsaturated carboxylic acids and metal salts of unsaturated carboxylic acids.

Suitable unsaturated carboxylic acids include, but are not particularly limited to, acrylic acid, methacrylic acid, maleic acid and fumaric acid. The use of acrylic acid or methacrylic acid is especially preferred.

Suitable metal salts of unsaturated carboxylic acids include, but are not particularly limited to, the above unsaturated carboxylic acids neutralized with a desired metal ion. Specific examples include the zinc salts and magnesium salts of methacrylic acid and acrylic acid. The use of zinc acrylate is especially preferred.

The amount of the co-crosslinking agent included in the rubber composition per 100 parts by weight of the base rubber, although not subject to any particular limitation, may be set to preferably at least 5 parts by weight, more preferably at least 10 parts by weight, and even more preferably at least 15 parts by weight. There is no particular upper limit in the amount of the co-crosslinking agent per 100 parts by weight of the base rubber, although this amount may be set to preferably not more than 60 parts by weight, more preferably not more than 50 parts by weight, even more preferably not more than 45 parts by weight, and most preferably not more than 40 parts by weight. Too much co-crosslinking agent may make the ball too hard, resulting in an unpleasant feel at impact. On the other hand, too little co-crosslinking agent may lower the rebound.

Commercially available products may be used as the organic peroxide in the rubber composition. For example, preferred use may be made of Percumyl D, Perhexa C-40, Perhexa 3M (all produced by NOF Corporation) or Luperco 231XL (Atochem Co.). These may be used singly or as a combination of two or more thereof.

The amount of organic peroxide included in the rubber composition per 100 parts by weight of the base rubber, although not subject to any particular limitation, may be set to preferably at least 0.1 part by weight, more preferably at least 0.3 part by weight, even more preferably at least 0.5 part by weight, and most preferably at least 0.7 part by weight. There is no particular upper limit in the amount of organic peroxide per 100 parts by weight of the base rubber, although this amount may be set to preferably not more than 5 parts by weight, more preferably not more than 4 parts by weight, even more preferably not more than 3 parts by weight, and most preferably not more than 2 parts by weight. Too much or too little organic peroxide may make it impossible to obtain a good feel at impact, durability and rebound.

Commercially available products may be used as the antioxidant in the rubber composition. Illustrative examples include Nocrac NS-6 and Nocrac NS-30 (both available from Ouchi Shinko Chemical Industry Co., Ltd.), and Yoshinox 425 (Yoshitomi Pharmaceutical Industries, Ltd.). These may be used singly, or two or more may be used in combination.

The amount of antioxidant included in the rubber composition, although not subject to any particular limitation, can be set to more than 0, and may be set to preferably at least 0.05 part by weight, and more preferably at least 0.1 part by weight, per 100 parts by weight of the base rubber. There is no particular upper limit in the amount of antioxidant included, although this amount may be set to preferably not more than 3 parts by weight, more preferably not more than 2 parts by weight, even more preferably not more than 1 part by weight, and most preferably not more than 0.5 part by weight. Too much or too little antioxidant may make it impossible to obtain a good rebound and durability.

Preferred use may be made of inert fillers such as zinc oxide, barium sulfate and calcium carbonate in the rubber composition. These may be used singly, or two or more may be used in combination.

The amount of inert filler included in the rubber composition, although not subject to any particular limitation, may be set to preferably at least 1 part by weight, and more preferably at least 5 parts by weight, per 100 parts by weight of the base rubber. There is no particular upper limit in the amount of inert filler included per 100 parts by weight of the base rubber, although this amount may be set to preferably not more than 50 parts by weight, more preferably not more than 40 parts by weight, even more preferably not more than 30 parts by weight, and most preferably not more than 25 parts by weight. Too much or too little inorganic filler may make it impossible to achieve a suitable weight and a good rebound.

In addition, to enhance rebound by the golf ball, it is preferable for the rubber composition to include an organosulfur compound. The organosulfur compound is not subject to any particular limitation, provided it is capable of enhancing the golf ball rebound. Preferred use may be made of thiophenols, thionaphthols, halogenated thiophenols, and metal salts thereof. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and diphenylpolysulfides, dibenzylpolysulfides, dibenzoylpolysulfides, dibenzothiazoylpolysulfides and dithiobenzoylpolysulfides having 2 to 4 sulfurs. In this invention, of the above, the use of diphenyldisulfide or the zinc salt of pentachlorothiophenol is especially preferred.

The amount of the organosulfur compound included per 100 parts by weight of the base rubber, although not subject to any particular limitation, may be set to preferably at least 0.05 part by weight, more preferably at least 0.1 part by weight, and even more preferably at least 0.2 part by weight. There is no upper limit in the amount of organosulfur compound included per 100 parts by weight of the base rubber, although this amount is preferably not more than 5 parts by weight, more preferably not more than 3 parts by weight, and even more preferably not more than 2.5 parts by weight. Including too little may make it impossible to obtain a sufficient rebound-enhancing effect. On the other hand, if too much is included, the rebound-enhancing effect (particularly on shots with a W#1) reaches a peak beyond which no further effect can be expected, in addition to which the core may become too soft, possibly worsening the feel of the ball at impact.

The specific gravity of the envelope layer, although not subject to any particular limitation, may be set to preferably not more than 1.5, more preferably not more than 1.35, and even more preferably not more than 1.25. There is no particular lower limit in the specific gravity, although the specific gravity may be set to preferably at least 1.0, more preferably at least 1.1, and even more preferably at least 1.2. If the specific gravity of the envelope layer falls outside of the above range, a good resilience may not be obtained, it may not be possible to obtain the desired hardness, as a result of which a good distance may not be achieved, and the durability to cracking under repeated impact may worsen.

The envelope layer forming method may be a known method and is not subject to any particular limitation, although preferred use may be made of the following method. First, an envelope layer-forming material is placed in a predetermined mold and subjected to primary vulcanization (semi-vulcanization) so as to produce a pair of hemispherical half-cups. Then, a prefabricated solid core is enclosed within the half-cups produced as just described, and secondary vulcanization (complete vulcanization) is carried out in this state. That is, advantageous use may be made of a process in which the vulcanization step is divided into two stages. Alternatively, advantageous use may be made of a process in which the envelope layer-forming material is injection-molded over the solid core.

Next, the intermediate layer is described.

The intermediate layer is a layer that covers the periphery of the envelope layer. In this invention, the thickness of the intermediate layer is not subject to any particular limitation, although it is recommended that the intermediate layer be formed so as to be thicker than the subsequently described cover. More specifically, it is recommended that the intermediate layer be set to a thickness of preferably at least 0.5 mm, more preferably at least 0.8 mm, and even more preferably at least 1.0 mm. There is no particular upper limit in the intermediate layer thickness, although the thickness may be set to preferably not more than 2.5 mm, more preferably not more than 2.0 mm, and even more preferably not more than 1.5 mm. If the thickness of the intermediate layer is larger than the above range or smaller than the thickness of the subsequently described outer cover layer, the spin rate-lowering effect on full shots with a driver (W#1) may be inadequate, as a result of which a good distance may not be achieved. Also, if the thickness of the intermediate layer is too small, the durability of the ball to cracking on repeated impact and the low-temperature durability may worsen.

The surface hardness of the intermediate layer, although not subject to any particular limitation, may be set to a Shore D value of preferably at least 60, more preferably at least 64, and even more preferably at least 66. There is no particular upper limit in the surface hardness of the intermediate layer, although the Shore D hardness may be set to preferably not more than 80, more preferably not more than 76, and even more preferably not more than 73. The material hardness of the intermediate layer, although not subject to any particular limitation, may be set to a Shore D value of preferably at least 53, more preferably at least 58, and even more preferably at least 60. There is no particular upper limit in the material hardness, although the Shore D hardness may be set to preferably not more than 75, more preferably not more than 70, and even more preferably not more than 67. If the hardness of the intermediate layer is too low, the ball may be too receptive to spin on full shots, which may result in a poor distance. On the other hand, if the hardness is too high, the durability to cracking on repeated impact may worsen or the feel of the ball when hit with a putter or on short approach shots may become too hard.

As used herein, "material hardness" refers to the hardness measured for a sample obtained by molding a material into a sheet of a predetermined thickness, and "surface hardness" refers to the hardness measured at the surface of a sphere molded from the material. Also, "Shore D hardness" refers to the hardness measured using a type D durometer in general accordance with ASTM D2240-95. The same applies below.

An ionomer resin is used as the material for forming the intermediate layer. Commercial products may be used as the ionomer resin. Illustrative examples include sodium-neutralized ionomer resins such as Himilan 1605, Himilan 1601 and AM7318 (all products of DuPont-Mitsui Polychemicals Co., Ltd.), and Surlyn 8120 (E.I. DuPont de Nemours & Co.); and zinc-neutralized ionomer resins such as Himilan 1557, Himilan 1706 and AM7317 (all products of DuPont-Mitsui Polychemicals Co., Ltd.). These may be used singly, or two or more may be used in combination.

These ionomer resins may be used singly or as combinations of two or more types. In the invention, from the standpoint of increasing the rebound of the ball, it is especially preferable to use a combination of a zinc-neutralized ionomer resin with a sodium-neutralized ionomer resin. In such a case, the compounding ratio by weight between the zinc-neutralized ionomer resin and the sodium-neutralized ionomer resin, although not subject to any particular limitation, may be set to generally between 25:75 and 75:25, preferably between 35:65 and 65:35, and more preferably between 45:55 and 55:45. At a compounding ratio outside the above range, the rebound may become too low, making it impossible to obtain the desired flight performance, the durability to cracking when repeatedly struck at ordinary temperatures may worsen, and the durability to cracking at low (subzero Celsius) temperatures may worsen.

In addition, various additives may optionally be included in the material for forming this intermediate layer. For example, additives such as pigments, dispersants, antioxidants, light stabilizers, ultraviolet absorbers and parting agents may be suitably included.

The specific gravity of the intermediate layer, although not particularly limited, may be set to preferably less than 1.0, more preferably 0.98 or less, and even more preferably 0.96 or less. The lower limit in the specific gravity may be set to preferably at least 0.90, and more preferably at least 0.94. At an intermediate layer specific gravity outside of the above range, the rebound becomes small, as a result of which a good distance is not obtained, and the durability to cracking under repeated impact worsens.

The method of forming the intermediate layer is not subject to any particular limitation, although a known method may be employed for this purpose. For example, use may be made of a method that involves injection-molding an intermediate layer-forming material over the envelope layer, or a method that involves prefabricating a pair of hemispherical half-cups from the intermediate layer-forming material, then enclosing an intermediate product (in this case, the sphere obtained by forming the envelope layer over the solid core) within these half-cups and molding under heat and pressure at 140 to 180° C. for 2 to 10 minutes.

Next, the cover is described. As used here in connection with the present invention, the term "cover" refers to the outermost layer of the ball and excludes the intermediate layer and envelope layer described above.

The surface hardness of the cover (that is, the surface hardness of the ball), although not subject to any particular limitation, may be set to a Shore D value of preferably at least 45, more preferably at least 50, and even more preferably at least 55. There is no particular upper limit in the surface hardness of the cover, although the Shore D hardness may be set to preferably not more than 70, more preferably not more than 65, and even more preferably not more than 60. The material hardness of the cover, although not subject to any particular limitation, may be set to a Shore D value of preferably at least 30, more preferably at least 40, and even more preferably at least 43. There is no particular upper limit in the material hardness, although the Shore D hardness may be set to preferably not more than 60, more preferably not more than 50, and even more preferably not more than 47. If the hardness of the cover is too low, the ball may be too receptive to spin on full shots, which may result in a poor distance. On the other hand, if the hardness is too high, the ball may not be receptive to spin on approach shots, as a result of which the controllability may be inadequate even for professional golfers and skilled amateur golfers.

The thickness of the cover is not subject to any particular limitation, although it is recommended that the cover thickness be set to preferably at least 0.3 mm, more preferably at least 0.5 mm, and even more preferably at least 0.7 mm. There is no particular upper limit in the cover thickness, although the thickness may be set to preferably not more than 1.5 mm, more preferably not more than 1.2 mm, and even more preferably not more than 1.0 mm. At a cover thickness larger than the above range, the ball rebound when struck with a driver (W#1) may be inadequate or the spin rate may be too high, as a result of which a good distance may not be obtained. On the other hand, if the cover thickness is smaller than the above range, the ball may have a poor scuff resistance or may have an inadequate controllability even for professional golfers and skilled amateur golfers.

From the standpoint of controllability and scuff resistance, the cover is formed using a resin composition composed primarily of urethane. Of such materials, in terms of amenability to mass production, the use of a thermoplastic polyurethane is especially preferred in this invention. More specifically, preferred use may be made of a material containing (A) a thermoplastic polyurethane and (B) an isocyanate compound.

To fully achieve the advantageous effects of the invention, a necessary and sufficient amount of unreacted isocyanate groups should be present within the cover resin material. Specifically, it is recommended that the combined weight of above component A and component B be preferably at least 60%, and more preferably at least 70%, of the overall weight of the cover layer. Above components A and B are described in detail below.

The thermoplastic polyurethane serving as component A has a structure which includes soft segments composed of a polymeric polyol that is a long-chain polyol (polymeric glycol), and hard segments composed of a chain extender and an isocyanate compound. Here, the long-chain polyol used as a starting material is not subject to any particular limitation, and may be any that is used in the prior art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of a cyclic ether. The polyether polyol may be used singly or as a combination of two or more thereof. Of these, preferred use may be made of poly(tetramethylene glycol) and poly(methyltetramethylene glycol).

It is preferable for these long-chain polyols to have a number-average molecular weight which, although not subject to any particular limitation, is in the range of 1,500 to 5,000. By using a long-chain polyol having a number-average molecular weight within this range, golf balls made of a thermoplastic polyurethane composition having excellent properties such as the above-described resilience and manufacturability can be reliably obtained. The number-average molecular weight of the long-chain polyol is more preferably in the range of 1,700 to 4,000, and even more preferably in the range of 1,900 to 3,000.

As used herein, "number-average molecular weight of the long-chain polyol" refers to the number-average molecular weight computed based on the hydroxyl number measured in accordance with JIS K-1557.

The chain extender used, although not subject to any particular limitation, is preferably one employed in the prior art relating to thermoplastic polyurethanes. For example, in the invention, use may be made of a low-molecular-weight compound which has a molecular weight of 400 or less and includes on the molecule two or more active hydrogen atoms capable of reacting with isocyanate groups. Of these, the use of an aliphatic diol having 2 to 12 carbons is preferred. Illustrative examples include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

The isocyanate compound is not subject to any particular limitation; preferred use may be made of one that is employed in the prior art relating to thermoplastic polyurethanes. Specific examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as above component A to be a thermoplastic polyurethane synthesized using a polyether polyol as the long-chain polyol, using an aliphatic diol as the chain extender, and using an aromatic diisocyanate as the isocyanate compound. It is desirable, though not essential, for the polyether polyol to be a polytetramethylene glycol having a number-average molecular weight of at least 1,900, for the chain extender to be 1,4-butylene glycol, and for the aromatic diisocyanate to be 4,4'-diphenylmethane diisocyanate.

The ratio of active hydrogen atoms to isocyanate groups in the above polyurethane-forming reaction can be controlled within a desirable range so as to make it possible to obtain a golf ball which is composed of a thermoplastic polyurethane composition and has various improved properties, such as rebound, spin performance, scuff resistance and manufacturability. Specifically, in preparing a thermoplastic polyurethane by reacting the above long-chain polyol, isocyanate compound and chain extender, it is desirable to use the respective components in proportions such that the amount of isocyanate groups included on the isocyanate compound per mole of active hydrogen atoms on the long-chain polyol and the chain extender is between 0.95 and 1.05 moles.

No particular limitation is imposed on the method of preparing component A. Production may be carried out by a prepolymer process or a one-shot process which uses a long-chain polyol, a chain extender and an isocyanate compound, and employs a known urethane-forming reaction. Of these, a process in which melt polymerization is carried out in a substantially solvent-free state is preferred. Production by continuous melt polymerization using a multiple screw extruder is especially preferred.

A commercially available product may be used as component A. Illustrative examples include Pandex T-8295, Pandex T-8290, Pandex T-8283 and Pandex T-8260 (all available from DIC Bayer Polymer, Ltd.).

Next, it is critical that the isocyanate compound serving as component B have two or more isocyanate groups. Moreover, in this invention, a sufficient amount of unreacted isocyanate groups to fully achieve the advantageous effects of the invention should be present in the cover-forming resin material. That is, isocyanate compound in which all the isocyanate groups on the compound are in an unreacted state may be present together with isocyanate compound in which some or all of the isocyanate groups have reacted.

Various types of isocyanates may be employed without particular limitation as this isocyanate compound. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, the use of 4,4'-diphenylmethane diisocyanate, dicyclohexylmethane diisocyanate and isophorone diisocyanate is preferable in terms of the balance between the influence on proccessability of such effects as the rise in viscosity that accompanies the reaction with the thermoplastic polyurethane serving as component A and the physical properties of the resulting golf ball cover material.

In the practice of the invention, although not an essential constituent, a thermoplastic elastomer other than the above-described thermoplastic polyurethane may be included as component C together with components A and B. Including this component C in the above resin blend makes it possible to further improve the flow properties of the resin blend and enables increases to be made in various properties required of golf ball cover materials, such as resilience and scuff resistance.

The compounding ratios of above components A to C are not subject to any particular limitation, although to fully achieve the advantageous effects of the invention, it is preferable for the weight ratio A:B:C of the respective components to be set to from 100:2:50 to 100:50:0.

In the practice of the invention, the resin blend is prepared by mixing together above component A, component B and also, if necessary, component C. It is preferable to select the mixing conditions such that, of the polyisocyanate compound, at least some polyisocyanate compound is present in which all the isocyanate groups on the molecule remain in an unreacted state. For example, it is preferable to furnish treatment such as purging with an inert gas (e.g., nitrogen) or vacuum treatment. The resin blend is then injection-molded over an intermediate product (in this case, a sphere obtained by forming the envelope layer and the intermediate layer over the solid core) which has been placed in a mold. For smooth and easy handling, it is preferable for the resin blend to be formed into pellets having a length of 1 to 10 mm and a diameter of 0.5 to 5 mm. Isocyanate groups in an unreacted state remain in these resin pellets; the unreacted isocyanate groups react with component A or component C to form a crosslinked material, either while the resin blend is being injection-molded over the intermediate product or due to post-treatment thereafter, such as annealing.

Various additives such as pigments, dispersants, antioxidants, ultraviolet absorbers, ultraviolet stabilizers, parting agents, plasticizers, and inorganic fillers (e.g., zinc oxide, barium sulfate, titanium dioxide) may be optionally included in the above-described resin composition, i.e., the cover-forming material.

The melt flow rate (MFR) of the above cover-forming material at 210° C. is not subject to any particular limitation. However, to increase the flow properties and manufacturability, the MFR is preferably at least 5 g/10 min, more preferably at least 20 g/10 min, and even more preferably at least 50 g/10 min. If the melt flow rate of the material is too small, the flow properties will decrease, which may cause eccentricity during injection molding and may also lower the degree of freedom of design in the cover thickness. The melt flow rate is measured in accordance with JIS K 7210-1999.

An example of a method which may be employed to mold the cover involves feeding the above cover-forming material to an injection molding machine, and injecting the molten material over the intermediate layer. Although the molding temperature in this case will vary depending on the type of thermoplastic polyurethane, the molding temperature is generally in the range of 150 to 250° C.

When injection molding is carried out, it is desirable, though not essential, to render the interior of the resin paths from the resin feed area to the mold interior into a low-humidity environment by subjecting some or all places on these resin paths to purging with an inert gas such as nitrogen or a low-moisture gas such as low dew-point dry air, or to vacuum treatment. Preferred, non-limiting, examples of the medium used for transporting the resin under applied pressure include inert gases such as nitrogen and low-humidity gases such as low dew-point dry air. By molding the cover in such a low-humidity environment, reaction by the isocyanate groups is suppressed as much as possible in the period up until the resin blend is charged into the mold interior. As a result, the resin blend has a stable viscosity and an improved moldability, in addition to which the real crosslinking efficiency can be enhanced.

By forming the cover in the above manner, a distance-increasing effect is obtained, in addition to which the spin performance on approach shots improves, enabling both controllability and distance to be achieved.

When forming the above cover, although not subject to any particular limitation, to increase adhesion with the intermediate layer, it is desirable to first subject the surface of the intermediate layer (that is, the sphere after formation of the intermediate layer) to abrasion treatment. In addition, it is preferable to apply a primer (adhesive) to the surface of the intermediate layer following abrasion treatment or to add an adhesion reinforcing agent to the cover-forming material. Examples of adhesion reinforcing agents that may be included in this material include organic compounds such as 1,3-butanediol and trimethylolpropane, and oligomers such as polyethylene glycol and polyhydroxy polyolefin oligomers. The use of trimethylolpropane or a polyhydroxy polyolefin oligomer is especially preferred. Examples of commercial products include trimethylolpropane available from Mitsubishi Gas Chemical Co., Ltd. and polyhydroxy polyolefin oligomers available from Mitsubishi Chemical Corporation (under the trade name "Polytail H"; number of main-chain carbons, 150 to 200; hydroxy-terminated).

Up until this point, details on the respective layers, that is, the solid core, envelope layer, intermediate layer and cover, have been described separately for each cover. Next, the relationships among these layers are described.

It is essential for the specific gravities of the envelope layer, intermediate layer and cover to satisfy the following relationship:

envelope layer specific gravity>intermediate layer specific gravity<cover specific gravity.

By having the specific gravities of the respective above layers satisfy this relationship, a good ball rebound can be ensured. If the specific gravity of the intermediate layer is too high, the rebound may under a large decrease.

Also, although not subject to any particular limitation, from the standpoint of ensuring a good resilience, it is preferable to set the specific gravity of the core so as to be smaller than the specific gravity of the envelope layer. In this case, the difference in specific gravity between the core and the envelope layer (envelope layer specific gravity−core specific gravity) may be set to 0.2 or less, preferably 0.15 or less, and more preferably 0.1 or less.

It is essential for the Shore D surface hardnesses of the core, the envelope layer, the intermediate layer and the cover to satisfy the following relationship:

core surface hardness<envelope layer surface hardness<intermediate layer surface hardness>cover surface hardness.

In this invention, by giving the intermediate layer a high surface hardness, the spin rate on full shots is suppressed; by giving the core a lower surface hardness than the intermediate layer, a good feel at impact that is not too hard is obtained on full shots; and by having the surface hardness of the envelope layer be a hardness intermediate between those of the intermediate layer and the solid core, a good rebound and a suitable feel at impact are imparted. In addition, by making the surface hardness of the cover (i.e., of the ball) softer than the surface hardness of the intermediate layer, a high controllability in the short game is conferred.

Moreover, the surface hardnesses of the respective layers preferably satisfy the following conditions.

The difference between the surface hardness of the envelope layer and the surface hardness of the core (i.e., the value of (envelope layer surface hardness−core surface hardness)), although not subject to any particular limitation, may be set to a Shore D hardness value of preferably at least 1, more preferably at least 10, and even more preferably at least 20. There is no particular upper limit, although the Shore D hardness value of this difference may be set to preferably not more than 40, more preferably not more than 35, and even more preferably not more than 30. If this hardness difference is too large, the durability to cracking under repeated impact may worsen. On the other hand, if the hardness difference is too small, and, in particular, if the surface hardness of the envelope layer is smaller than the surface hardness of the solid core, the spin rate on full shots may become too high, as a result of which a good distance may be not achieved.

The difference between the surface hardness of the intermediate layer and the surface hardness of the envelope layer (i.e., the value of (intermediate layer surface hardness−envelope layer surface hardness)), although not subject to any particular limitation, may be set to a Shore D hardness value of preferably at least 5, more preferably at least 7, and even more preferably at least 9. There is no particular upper limit, although the Shore D hardness value of this difference may be set to preferably not more than 25, more preferably not more than 20, and even more preferably not more than 12. If this hardness difference is too large, the durability to cracking under repeated impact may worsen. On the other hand, if the hardness difference is too small, the spin rate on full shots may become too high, as a result of which a good distance may be not achieved.

The difference between the surface hardness of the cover (i.e., of the ball) and the surface hardness of the intermediate layer (i.e., the value of (core surface hardness−intermediate layer surface hardness)), although not subject to any particular limitation, may be set to a Shore D hardness value of preferably at least −25, more preferably at least −20, and even more preferably at least −15. There is no particular upper limit, although the Shore D hardness value of this difference may be set to preferably not more than −1, more preferably not more than −5, and even more preferably not more than −10. If this hardness difference is too large (if the above value is too large in the negative direction), the durability to cracking under repeated impact may worsen. On the other hand, if the hardness difference is too small, the spin rate in the short game may be too small.

In the golf ball of the invention, as in conventional golf balls, numerous dimples may be formed on the surface of the cover in order to further increase the aerodynamic properties and extend the distance traveled by the ball. In such cases, the number of dimples formed on the ball surface, although not subject to any particular limitation, is preferably at least 280, more preferably at least 300, and even more preferably at least 320. The maximum number of dimples, although not subject to any particular limitation, may be set to preferably not more than 360, more preferably not more than 350, and even more preferably not more than 340. If the number of dimples is larger than the above range, the trajectory of the ball may become low, as a result of which a good distance may not be achieved. On the other hand, if the number of dimples is smaller than the above range, the trajectory may become high, as a result of which an increased distance may not be achieved.

The geometric arrangement of the dimples on the ball may be, for example, octahedral or icosahedral. In addition, the dimple shapes may be of one, two or more types suitably selected from among not only circular shapes, but also various polygonal shapes, such as square, hexagonal, pentagonal and triangular shapes, as well as dewdrop shapes and oval shapes. The dimple diameter (in polygonal shapes, the lengths of the diagonals), although not subject to any particular limitation, is preferably set to from 2.5 to 6.5 mm. In addition, the dimple depth, although not subject to any particular limitation, is preferably set to from 0.08 to 0.30 mm.

In this invention, the value $V_o$, defined as the spatial volume of a dimple below the flat plane circumscribed by the dimple edge, divided by the volume of the cylinder whose base is the flat plane and whose height is the maximum depth of the dimple from the base, although not subject to any particular limitation, may be set to from 0.35 to 0.80.

From the standpoint of reducing aerodynamic resistance, the ratio SR of the sum of individual dimple surface areas, each defined by the flat plane circumscribed by the edge of a dimple, with respect to the surface area of the ball sphere were the ball surface to have no dimples thereon, although not subject to any particular limitation, is preferably set to from 60 to 90%. This ratio SR can be elevated by increasing the number of dimples formed, and also by intermingling dimples of a plurality of types of differing diameters or by giving the dimples shapes such that the distances between neighboring dimples (i.e., the widths of the lands) become substantially 0.

The ratio VR of the sum of the spatial volumes of individual dimples, each formed below the flat plane circumscribed by the edge of a dimple, with respect to the volume of the ball sphere were the ball surface to have no dimples thereon, although not subject to any particular limitation, is preferably set to from 0.6 to 1% in this invention.

In this invention, by setting the above $V_o$, SR and VR values in the foregoing ranges, the aerodynamic resistance is reduced, in addition to which a trajectory enabling a good distance to be achieved is readily obtained, making it possible to improve the flight performance.

The diameter of the golf ball obtained by forming the respective above-described layers has a diameter which should conform to the standards for golf balls, and is preferably not less than 42.67 mm. There is no particular upper limit in the golf ball diameter, although the diameter may be set to preferably not more than 44 mm, more preferably not more than 43.8 mm, even more preferably not more than 43.5 mm, and most preferably not more than 43 mm. The weight of the golf ball also not subject to any particular limitation, although for similar reasons is preferably set in the range of 45.0 to 45.93 g.

Also, in this invention, the surface of the ball cover may be subjected to various types of treatment, such as surface preparation, stamping and painting, in order to enhance the design and durability of the golf ball.

As explained above, the present invention provides a multi-piece solid golf ball which can achieve an increased distance on full shots with a driver (W#1) and enhance controllability in the short game, and which moreover enables an even lower spin rate to be achieved on full shots.

EXAMPLES

Examples of the invention are given below by way of illustration, and not by way of limitation.

Examples 1 and 2

First, a solid core was fabricated by injecting Hytrel 3046 (DuPont-Toray Co., Ltd.) into a core mold.

Next, the rubber compositions formulated as shown in Table 1 were prepared using a roll mill, then subjected to 3 minutes of primary vulcanization (semi-vulcanization) at 35° C., thereby producing a pair of hemispherical half-cups. Next, the solid core was enclosed within the half-cups and subjected to 14 minutes of secondary vulcanization (complete vulcanization) at 155° C. in a mold, thereby forming an envelope layer.

TABLE 1

| Formulation (parts by weight) | A | B |
|---|---|---|
| Polybutadiene rubber | 100 | 100 |
| Zinc acrylate | 31.5 | 29.5 |
| Organic peroxide | 1.2 | 1.2 |
| Antioxidant | 0.1 | 0.1 |
| Zinc oxide | 4.0 | 4.0 |
| Barium sulfate | 19.1 | 20.0 |
| Zinc salt of pentachlorothiophenol | 0.1 | 0.1 |

Details on the materials in Table 1 are given below.

Polybutadiene rubber: Available as "BR730" from JSR Corporation. A polybutadiene rubber obtained using a neodymium catalyst; cis-1,4 bond content, 96 wt %; Mooney viscosity, 55; molecular weight distribution, 3.

Zinc acrylate: Available from Nihon Jyoryu Kogyo Co., Ltd.

Organic peroxide: Available as "Perhexa C-40" from NOF Corporation. 1,1-Bis(t-butylperoxy)-cyclohexane diluted to 40% with an inorganic filler. Half-life at 155° C., about 50 seconds.

Antioxidant: 2,6-Di-t-butyl-4-methylphenol, available as "Nocrac 200" from Ouchi Shinko Chemical Industry Co., Ltd.

Barium sulfate: Available as "Precipitated Barium Sulfate 100" from Sakai Chemical Co., Ltd.

Figure 2:
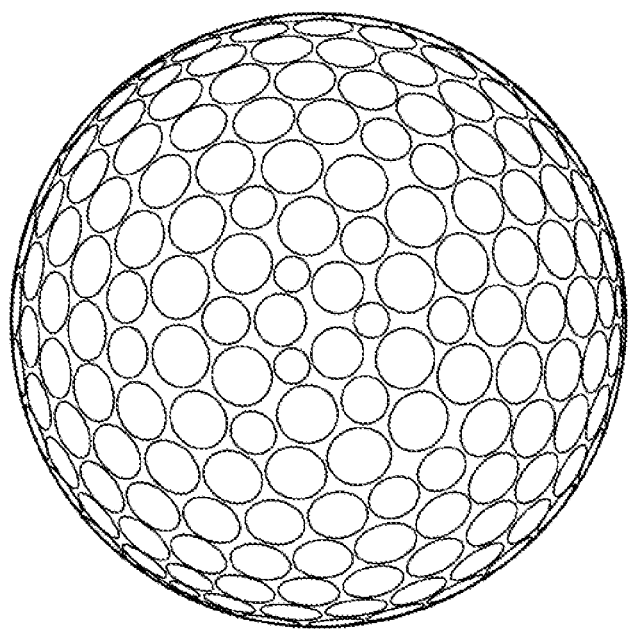
FIG. 2 is a top view showing the arrangement of dimples formed on the surface of the balls in the examples.

In addition, an intermediate layer was formed by injection-molding the resin materials (No. 1) formulated as shown in Table 2 over the envelope layer formed as described above. Next, the starting materials shown under No. 2 in Table 2 (units are in parts by weight) were mixed under a nitrogen atmosphere in a twin-screw extruder, thereby obtaining a cover-forming resin material. This resin material was in the form of pellets having a length of 3 mm and a diameter of 1 to 2 mm. A cover was formed by injection-molding the pelletized resin material (No. 2) over the intermediate layer formed as described above, thereby giving a multi-piece solid golf ball with a four-layer construction composed of a solid core that is enclosed by, in turn, an envelope layer, an intermediate layer and a cover. Dimples having the configuration shown in FIG. 2 were formed at this time on the surface of the cover on the balls obtained in each example. Details on the dimples are shown in Table 3. Details on the balls that were fabricated are shown in Table 4.

TABLE 2

| Formulation (pbw) | No. 1 | No. 2 |
| --- | --- | --- |
| Himilan 1605 | 50 | |
| Himilan 1706 | 35 | |
| Himilan 1557 | 15 | |
| Trimethylolpropane | 1.1 | |
| Pandex T-8290 | | 37.5 |
| Pandex T-8283 | | 62.5 |
| Titanium oxide | | 3.5 |
| Polyethylene wax | | 1.5 |
| Isocyanate compound | | 9 |

Details on the materials in Table 2 are given below.

Himilan 1605, 1706, 1557: Ionomer resins available from DuPont-Mitsui Polychemicals Co., Ltd.

Pandex T-8290, T-8283: MDI-PTMG type thermoplastic polyurethanes available from DIC Bayer Polymer.

Titanium oxide: Available as "Tipaque R680" from Ishihara Sangyo Kaisha, Ltd.

Polyethylene wax: Available under the trade name "Sanwax 161P" from Sanyo Chemical Industries, Ltd.

Isocyanate compound: 4,4'-Diphenylmethane diisocyanate.

TABLE 3

| No. | Number of dimples | Diameter (mm) | Depth (mm) | $V_0$ | SR (%) | VR (%) |
| --- | --- | --- | --- | --- | --- | --- |
| 1 | 12 | 4.6 | 0.15 | 0.47 | 81 | 0.78 |
| 2 | 234 | 4.4 | 0.15 | 0.47 | | |
| 3 | 60 | 3.8 | 0.14 | 0.47 | | |
| 4 | 6 | 3.5 | 0.13 | 0.46 | | |

TABLE 3-continued

| No. | Number of dimples | Diameter (mm) | Depth (mm) | $V_0$ | SR (%) | VR (%) |
| --- | --- | --- | --- | --- | --- | --- |
| 5 | 6 | 3.4 | 0.13 | 0.46 | | |
| 6 | 12 | 2.6 | 0.10 | 0.46 | | |
| Total | 330 | | | | | |

Dimple Definitions

Diameter: Diameter of flat plane circumscribed by edge of dimple.

Depth: Maximum depth of dimple from flat plane circumscribed by edge of dimple.

$V_0$: Spatial volume of dimple below flat plane circumscribed by dimple edge, divided by volume of cylinder whose base is the flat plane and whose height is the maximum depth of dimple from the base.

SR: Sum of individual dimple surface areas, each defined by the flat plane circumscribed by the edge of the dimple, as a percentage of the surface area of a hypothetical sphere were the ball to have no dimples on the surface thereof (units: %).

VR: Sum of spatial volumes of individual dimples formed below flat plane circumscribed by the edge of the dimple, as a percentage of the volume of a hypothetical sphere were the ball to have no dimples on the surface thereof (units: %).

The following properties were investigated for the golf balls obtained. Also, flight tests were carried out by the following methods, in addition to which the feel at impact was evaluated. The results are shown in Table 4.

(1) Core Deflection (mm)

The core was placed on a hard plate, and the amount of deformation by the core when compressed under a final load of 1,275 N (130 kgf) from an initial load state of 98 N (10 kgf) was measured.

The above deflections are all measured values obtained after first holding the core isothermally at 23° C.

(2) Center Hardness of Core (Shore D Hardness)

The core was cut in half (through the center) and measurement was carried out by perpendicularly pressing the indenter of a type D durometer, as stipulated in ASTM D2240-95, against the center of the cross-section.

The above hardness is a measured value obtained after holding the core isothermally at 23° C. The results obtained by converting this center hardness into a JIS-C hardness value (in accordance with JIS K 6301) are also shown in Table 4.

(3) Surface Hardnesses (Shore D Hardnesses) of Core, Envelope Layer, Intermediate Layer and Cover Measurement was carried out by perpendicularly pressing the indenter of a type D durometer, as stipulated in ASTM D2240-95, against the surface of the intermediate product at the stage where the layer to be measured has been formed or against the surface of the ball. The surface hardness of the ball (i.e., the cover) is the value measured at a land area where a dimple is not formed on the ball surface.

The above hardnesses are all measured values obtained after holding the intermediate product or the ball isothermally at 23° C. The results obtained by converting these surface hardnesses into JIS-C hardness values (in accordance with JIS K 6301) are also shown in Table 4.

(4) Material Hardness of Intermediate Layer (Shore D Hardness)

The intermediate layer-forming material was molded into sheets having a thickness of about 2 mm and held for two weeks at 23° C., following which the sheets were stacked to a thickness of at least 6 mm, and the hardness was measured with a type D durometer in accordance with ASTM D2240-95. The results obtained by converting this material hardness into a JIS-C hardness value (in accordance with JIS K 6301) are also shown in Table 4.

(5) Material Hardness of Cover (Shore D Hardness)

A 2 mm thick sheet obtained by injection molding the cover-forming material was annealed at 100° C. for 8 hours and left to stand for one week at room temperature, following which the hardness was measured with a type D durometer in accordance with ASTM D2240-95. The results obtained by converting this material hardness into a JIS-C hardness value (in accordance with JIS K 6301) are also shown in Table 4.

(6) Flight Performance

A driver (W#1) was mounted on a golf swing robot, and the spin rate, carry and total distance when the ball was struck at a head speed (HS) of 45 m/s was measured. The club used was a TourStage X-Drive 705, TYPE 415 driver (2011 model; loft, 9.5°) manufactured by Bridgestone Sports Co., Ltd.

(7) Spin Rate on Approach Shots

A sand wedge (SW) was mounted on a golf swing robot, and the spin rate when the ball was struck at a head speed (HS) of 20 m/s was measured. The club used was a TourStage X-WEDGE (loft, 56°) manufactured by Bridgestone Sports Co., Ltd.

TABLE 4

| | | Example 1 | Example 2 |
|---|---|---|---|
| Core | Material | Hytrel 3046 | Hytrel 3046 |
| | Diameter (mm) | 23.0 | 23.0 |
| | Weight (g) | 6.9 | 6.9 |
| | Specific gravity | 1.07 | 1.07 |
| | Deflection (mm) | 6.8 | 6.8 |
| | Surface hardness (JIS-C) | 55 | 55 |
| | Surface hardness (Shore D) | 34 | 34 |
| | Center hardness (JIS-C) | 47 | 47 |
| | Center hardness (Shore D) | 28 | 28 |
| | Surface hardness − center hardness (JIS-C) | 8 | 8 |
| | Surface hardness − center hardness (Shore D) | 6 | 6 |
| Envelope layer | Material | A | B |
| | Thickness (mm) | 7.8 | 7.8 |
| | Specific gravity | 1.17 | 1.17 |
| | Surface hardness (JIS-C) | 88 | 86 |
| | Surface hardness (Shore D) | 59 | 57 |
| Envelope layer-covered sphere | Diameter (mm) | 38.7 | 38.7 |
| | Weight (g) | 35.0 | 35.0 |
| Intermediate layer | Material | No. 1 | No. 1 |
| | Thickness (mm) | 1.2 | 1.2 |
| | Specific gravity | 0.96 | 0.96 |
| | Surface hardness (JIS-C) | 100 | 100 |
| | Surface hardness (Shore D) | 68 | 68 |
| | Material hardness (JIS-C) | 92 | 92 |
| | Material hardness (Shore D) | 62 | 62 |
| Intermediate layer-covered sphere | Diameter (mm) | 41.1 | 41.1 |
| | Weight (g) | 40.6 | 40.6 |
| Cover | Material | No. 2 | No. 2 |
| | Thickness (mm) | 0.8 | 0.8 |
| | Specific gravity | 1.12 | 1.12 |
| | Surface hardness (JIS-C) | 87 | 87 |
| | Surface hardness (Shore D) | 58 | 58 |
| | Material hardness (JIS-C) | 68 | 68 |
| | Material hardness (Shore D) | 44 | 44 |
| Ball | Diameter (mm) | 42.7 | 42.7 |
| | Weight (g) | 45.5 | 45.5 |
| Envelope layer surface hardness − core surface hardness (Shore D) | | 25 | 23 |
| Intermediate layer surface hardness − envelope layer surface hardness (Shore D) | | 9 | 11 |

TABLE 4-continued

| | | | Example 1 | Example 2 |
|---|---|---|---|---|
| Cover surface hardness − intermediate layer surface hardness (Shore D) | | | −10 | −10 |
| Performance evaluation | Flight performance (W#1) | Spin rate (rpm) | 2815 | 2838 |
| | | Carry (m) | 210.9 | 210.9 |
| | | Total distance (m) | 226.4 | 229.6 |
| | Spin rate on approach shots | Spin rate (rpm) | 6143 | 6102 |

The invention claimed is:

1. A multi-piece solid golf ball comprising a core, an envelope layer encasing the core, an intermediate layer encasing the envelope layer, and a cover which encases the intermediate layer and has formed on a surface thereof a plurality of dimples,
    wherein the core is formed primarily of one or more thermoplastic elastomer selected from the group consisting of polyester, polyamide, polyurethane, olefin and styrene-type thermoplastic elastomers and has a diameter of from 10 to 30 mm, a specific gravity of more than 1.0 and less than 1.3, and a deflection when compressed under a final load of 1,275 N (130 kgf) from an initial load of 98 N (10 kgf) of from 3.6 to 10 mm,
    the envelope layer is formed of a rubber composition containing primarily a rubber material and has a thickness of from 3 to 10 mm,
    the intermediate layer is formed of a resin composition containing primarily an ionomer, and the cover is formed of a resin composition containing primarily a urethane;
    wherein the intermediate layer has a specific gravity of less than 1.0;
    wherein the envelope layer, the intermediate layer and the cover have specific gravities which satisfy the condition:

envelope layer specific gravity>intermediate layer specific gravity<cover specific gravity;

and wherein the core, the envelope layer, the intermediate layer and the cover have Shore D surface hardnesses which satisfy the condition:

core surface hardness<envelope layer surface hardness<intermediate layer surface hardness>cover surface hardness.

2. The multi-piece solid golf ball of claim 1, wherein the core is formed primarily of a polyether ester elastomer.

3. The multi-piece solid golf ball of claim 1, wherein the core has a diameter of from 20 to 30 mm.

4. The multi-piece solid golf ball of claim 1, wherein the core diameter is from 22 to 28 mm.

5. The multi-piece solid golf ball of claim 1, wherein the envelope layer thickness is from 4 to 8 mm.

6. The multi-piece solid golf ball of claim 1, wherein the core, the envelope layer, the intermediate layer and the cover have Shore D surface hardnesses which satisfy the conditions:

1≤envelope layer surface hardness−core surface hardness≤40

5≤intermediate layer surface hardness−envelope layer surface hardness≤25

−25≤ball surface hardness−intermediate layer surface hardness≤−1.

* * * * *